(12) United States Patent
Venkataramani et al.

(10) Patent No.: US 6,620,763 B1
(45) Date of Patent: Sep. 16, 2003

(54) PROCESS FOR THE MANUFACTURE OF AN ATTRITION RESISTANT SORBENT USED FOR GAS DESULFURIZATION

(75) Inventors: Venkat S. Venkataramani, Clifton Park, NY (US); Raul E. Ayala, Clifton Park, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 176 days.

(21) Appl. No.: 09/852,040

(22) Filed: May 10, 2001

(51) Int. Cl.$^7$ .................................................. B01J 20/00
(52) U.S. Cl. ...................... 502/400; 502/439; 502/500; 502/504; 502/514; 502/517
(58) Field of Search ................................. 502/400, 439, 502/500, 504, 514, 517

(56) References Cited

U.S. PATENT DOCUMENTS

| | | | | |
|---|---|---|---|---|
| 5,188,811 A | * | 2/1993 | Ayala | 423/230 |
| 5,254,516 A | * | 10/1993 | Gupta et al. | 502/84 |
| 5,494,880 A | * | 2/1996 | Siriwardane | 502/400 |
| 5,693,588 A | * | 12/1997 | Poston | 502/400 |
| 5,714,431 A | * | 2/1998 | Gupta et al. | 502/400 |
| 5,866,503 A | * | 2/1999 | Siriwardane | 502/439 |
| 5,972,835 A | * | 10/1999 | Gupta | 502/439 |

* cited by examiner

Primary Examiner—Stanley S. Silverman
Assistant Examiner—Timothy C. Vanoy
(74) Attorney, Agent, or Firm—Brian J. Lally; Daniel D. Park; Paul A. Gottlieb

(57) ABSTRACT

This process produces a sorbent for use in desulfurization of coal gas. A zinc titanate compound and a metal oxide are mixed by milling the compounds in an aqueous medium, the resulting mixture is dried and then calcined, crushed, sleved and formed into pellets for use in a moving-bed reactor. Metal oxides suitable for use as an additive in this process include: magnesium oxide, magnesium oxide plus molybdenum oxide, calcium oxide, yttrium oxide, hafnium oxide, zirconium oxide, cupric oxide, and tin oxide. The resulting sorbent has a percentage of the original zinc or titanium ions substituted for the oxide metal of the chosen additive.

12 Claims, No Drawings

PROCESS FOR THE MANUFACTURE OF AN ATTRITION RESISTANT SORBENT USED FOR GAS DESULFURIZATION

U.S. GOVERNMENT RIGHTS

The United States Government has rights in this invention pursuant Contract No. DE-AC21-94MC31089 between the United States Department of Energy and General Electric Company.

BACKGROUND OF THE INVENTION

This process of manufacture results in an attrition resistant sorbent for use in gas desulfurization processes. In the process of desulfurization of coal gases, mixed metal oxides have been used to remove hydrogen sulfide ($H_2S$) in the temperature range of 370 to 650° C. (700 to 1200° F.). Although the reactivities of zinc titanates and other zinc based sorbents are acceptable in this temperature range, the physical and mechanical integrity of the sorbents needs to be improved so that the sorbents can be used over repetitive cycles of sulfur absorption and sorbent regeneration. For moving-bed reactor configurations, the mixed metal sorbents are prepared from powders which are extruded into pellets and calcined to achieve a balance point of desired reactivity and pellet strength as measured by attrition and crush strength tests. Unfortunately, this balance between reactivity and pellet strength is difficult to achieve and many highly reactive pellets become mechanically weak and fall apart after several cycles due to repetitive phase transformations that occur during repeated cycles of absorption and regeneration. During sulfur removal, zinc-based oxides become zinc sulfide as shown in Equation 1.

$$Zn_2TiO_4 + 2H_2S \rightarrow 2ZnS + TiO_2 + 2H_2O \quad \text{(Equation 1)}$$

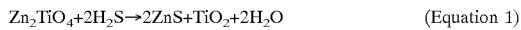

During regeneration, the sulfide form is oxidized under diluted air back to the zinc oxide or zinc titanate structure as shown in Equation 2.

$$2ZnS + TiO_2 + 3O_2 \rightarrow Zn_2TiO_4 + 2SO_2 \quad \text{(Equation 2)}$$

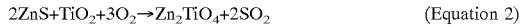

However, a certain level of zinc sulfate may be formed in the regeneration process. Zinc sulfate is detrimental because it reduces the sulfur absorption capacity of the sorbent, does not release the sulfur as a desired sulfur dioxide ($SO_2$) product, and is often re-released to the clean gas in the subsequent absorption step. Additionally, the appearance and build-up of zinc sulfate results in the structural weakening of the pellets and leads to the attrition of pellet materials.

To prevent pellet weakening and eventual degradation, additives can be included in the zinc titanate formulations to stabilize phases, allow plasticity, and reduce mechanical stresses during phase transformations between the zinc sulfide layer and regenerated (i.e., oxidized) states of the sorbent pellet.

U.S. Pat. No. 5,494,880 ("'880") issued to Siriwardane claims sorbent pellets containing zinc oxide, titanium oxide, silica gel, Bentonite and calcium sulfate for removing $H_2S$ from a gas stream. U.S. Pat. No. 5,86,503 ("'503") issued to Siriwardane includes in its claims a mixed metal oxide with an inert material selected for particle size with the purpose of creating void space between the pellet components. The void space increases the porosity of the sorbent and is said to provide additional durability. The current application differs from '880 in that the sorbent resulting from the current process involves zinc titanate compounds to which metal oxides have been added resulting in a chemical substitution of zinc and/or titanate ions within the zinc titanate compound for the metal of the oxide that was added.

U.S. Pat. No. 5,188,811 ("'811") issued to inventor Ayala described the usefulness of mixed metal oxides, including zinc titanate compounds, in sulfur removal and simultaneous ammonia decomposition catalysts when combined with molybdenum. The inventor's current process adds molybdenum oxide only in combination with magnesium oxide and this combination is only one of several potential metal oxide additives described here.

Gupta, et al. was granted a series of patents including, U.S. Pat. No. 5,254,516 ("'516"); U.S. Pat. No. 5,714,431 ("'431"); U.S. Pat. No. and 5,97,835 ("'835"), that include zinc titanate materials in sorbents used in fluidized bed reactors for removal of sulfur species. Gupta's '431 patent is for desulfurization applications where zinc titanate sorbents are of a spherical shape of uniform size and high reactivity composition adjusted to an average particle size of less than 300 microns . The '835 patent claims a process for making attrition resistant spray dried fluidizable particles of between 100 and 400 microns. The '516 patent starts with zinc titanate to which is added small amounts of CoO and $MoO_3$. Claimed in the patent are additions to zinc titanate including: Groups VIB, VIIB and VIII metal compounds and Groups IA and IIA alkali and alkaline earth metal compounds. In addition to these groups of compounds. the '516 patent also requires the addition of an inorganic and organic binder. The current process focuses on sorbents for use in moving-bed reactors while Gupta's sorbents are for fluidized beds. Gupta also requires the addition of both an organic and inorganic binder whereas the current process has no such requirements.

The key to preventing pellet degradation due to phase transformation is the ability to modify the chemical composition and pelletization of the sorbent so that it can withstand phase transformations. The present sorbent is attrition resistant due to the chemical substitution of another metal (including magnesium, calcium, yttrium, zirconium, hafnium, copper, and molybdenum plus magnesium) for the zinc or titanium atoms within a zinc titanate compound. The method described here results in an attrition resistant sorbent when actual chemical substitution of the metals occurs and in the case of the metal (added as a metal oxide) being incorporated into the structure of the sorbent as a grain growth inhibitor.

OBJECTS OF THE INVENTION

The primary object of this invention is to provide a process that results in a modified zinc titanate sorbent for use in gas desulfurization that has increased attrition resistance, increased mechanical strength and where the sorbent's reactivity for sulfur removal has not been diminished. The modified sorbent has zinc and/or titanate ions within the original zinc titanate compound substituted with the ions from a metal oxide additive.

The resulting sorbent has had 2% of the original zinc ions substituted by magnesium ions, or a magnesium ion substituted for about 11 mol % as magnesium oxide. Or the resulting sorbent has had about 2% of the original titanium ions substituted for zirconium ions.

An alternate object of the invention is to incorporate a grain growth inhibitor into the crystalline structure of the zinc titanate sorbent by the process described here. The source of the grain growth inhibitor is a metal oxide.

SUMMARY OF THE INVENTION

This process results in an improved sorbent for use in desulfurization of coal gas streams by increasing attrition resistance and mechanical strength while maintaining the sorbent's reactivity for sulfur removal. The process starts with a zinc titanate compound to which is added, by milling in an aqueous medium, a metal oxide and then about 3 weight percent silica. The mixture is calcined, crushed, sieved and formed into pellets for use in a moving-bed reactor.

Metal oxides suitable for use as an additive in this process include: magnesium oxide, magnesium oxide plus molybdenum oxide, calcium oxide, yttrium oxide, hafnium oxide, zirconium oxide, and cupric oxide. The resulting sorbent has a percentage of the original zinc or titanium ions substituted for the oxide metal of the chosen additive. The resulting sorbent may in addition to, or instead of, the ionic substitution have the metal oxide added incorporated into the sorbent's crystalline structure as a grain growth inhibitor.

DETAILED DESCRIPTION OF THE PREFERRED EMBODIMENT

To improve the attrition resistance and mechanical strength of the zinc titanate sorbent pellets used in desulfurization processes, suitable oxides of metals were incorporated into the structure of these compounds. Most commonly the zinc titanate $Zn_2TiO_4$ is used, other zinc titanate compounds such as $ZnTiO_3$ and $Zn_2TiO_8$ can be effectively used in this process. Suitable metal oxide additives include magnesium oxide, magnesium oxide plus molybdenum oxide, calcium oxide, zirconium oxide and cupric oxide. Hafnium oxides are in the same chemical group as zirconium oxides and, therefore, are expected to behave in this process similar to zirconium oxides. The tin of a tin oxide component may also replace the titanium element of the of the zinc titanate compound, or may be incorporated as tin oxide within the crystalline structure of the sorbent as a grain growth inhibitor.

The improved mechanical properties and attrition resistance of the sorbents described herein are due to the toughening of the ceramic brought on by (1) the fundamental mechanical properties of the metal/metal oxide additions/substitutions; (2) grain size reduction due to the metal/metal oxide additions/substitutions; (3) the change in the lattice strains due to the size difference of the metal/metal oxide additions/substituions; and (4) enhanced thermochemical and thermomechanical stability from the metal/metal oxide additions/substitutions. Larger elements, such as yttrium or rare earth metals, are expected to increase the attrition resistance and mechanical integrity of the zinc titanate sorbents if the element were to be incorporated into the zinc titanate structure as described here.

The process described here uses metal oxide additives that result in the substitution of the oxide metal for either the zinc or titanium elements within the zinc titanate compound. The resulting structure has been shown to reduce the level of attrition and to increase mechanical strength of the sorbent pellets. The process by which the chemical substitution of a metal for either zinc or titanium occurs, may result in the corresponding metal being incorporated at the crystalline, rather than the molecular, level where the metal serves as a grain growth inhibitor.

Two examples of chemical substitution for zinc or titanium include Example 1 where magnesium ions were substituted for zinc ions at a level of 2% of the original zinc ions, and Example 2 where zirconium ions replaced 2% of the original titanium ions. The constituent oxides were mixed by milling in aqueous medium in a jar with zirconia media. Three weight percent of silica as fumed silica was added to promote the compound formation and densification on calcining the mixtures at 750° C. for 3 hours. The product after calcination was crushed and sieved to produce the granular sorbents. The sulfidation and regeneration was done in a four zone modified reactor. The attrition resistance was tested after 5 cycles of sorption and regeneration by measuring the attrition loses according to ASTM D4058-81 standards. As shown in Table 1, both the addition of magnesium oxide and the addition of zirconium oxide improve the attrition resistance of the sorbent (i.e., reduces the attrition loss) as well as its regenerative capacity after five cycles over the case where no additives were included.

There is no evidence to indicate that this process results in reduced sorbent reactivity or in reduced regeneration efficiency. The sulfide content was not increased by the addition or incorporation of these elements as the sulfide sulfur content remained low with the substitutions indicating that regeneration efficiency has not decreased. And in fact, the sulfate sulfur content, which may build up and further contribute to pellet weakening and sorbent attrition, decreased with the addition or incorporation of the magnesium or zirconium ions as compared to the zinc titanate compound that had no metal oxide additions during sorbent pellet preparation.

Silica was added to the processes of Examples 1 and 2 to improve density at these process conditions. However, the addition of silica is not required to achieve the metal substitutions or metal oxide additions as grain growth inhibitor.

EXAMPLE 1

1.98 mol zinc oxide;
1.00 titanium oxide;
Add 0.02 mol magnesium oxide, mill in aqueous medium;
Add about 3 weight percent silica;
calcine the mixture at about 750° C. for 3 hours;
crush and sieve calcined product and form into pellets.

EXAMPLE 2

2.00 mol zinc oxide;
0.98 mol titanium oxide;
Add 0.02 mol zirconium oxide, mill in aqueous medium;
Add about 3 weight percent silica;
calcine the mixture at about 750° C. for 3 hours;
crush and sieve calcined product and form into pellets.

TABLE 1

Performance Results of Sorbents Resulting from Chemical Addition Examples 1 and 2.

| Composition | 1 No Addition | 2 MgO Addition from Example 1 | 3 $ZrO_2$ Addition from Example 2 |
|---|---|---|---|
| Attrition loss - fresh | 1.00% | 2.00% | 1.96% |
| Attrition after 5 cycles | 5.23% | 2.74% | 1.83% |
| Sulfide sulfur content | <0.1% | <0.1% | <0.1% |
| Sulfate sulfur content | 4.95% | 3.80% | 0.23% |

The combined effect of these additions would also produce substitutions such as (Mg+Mo) and/or substitution of larger ions such as Ca, Y, etc. would also result in improved attrition resistance due to the expansion of the lattice enabling better accommodation of the volume increase that occurs during the sorption step.

The amounts of metal oxide to be added to the zinc titanate during this process are listed in Table 2. It is anticipated that the optimum amount may be any amount that is within the saturation limits of the metal oxide. The oxide substitutions can be optimized within their solid solubility limits into the zinc titanate composition. However, enough zinc ions must remain for effective sulfur removal from the coal gas stream.

TABLE 2

Ranges of chemical additives (added as oxides) to replace Zn or Ti in a zinc titanate compound (in mol %)

| Titanate | Additive | | | | |
|---|---|---|---|---|---|
| | Mg(O) | MgO + Mo(O) | $ZrO_2$ | Ca(O) | Cu(O) |
| $Zn_2TiO_4$ | 0.01–30 | 0.01–30 | 0.01–30 | 0.01–10 | 0.01–10 |
| $ZnTiO_3$ | 0.01–30 | 0.01–30 | 0.01–30 | 0.01–10 | 0.01–10 |
| $Zn_2TiO_8$ | 0.01–30 | 0.01–30 | 0.01–30 | 0.01–10 | 0.01–10 |

These oxides can be added to zinc titanate by themselves according to the process described here, or may be added in combination with one another. For example, magnesium and zirconium could both be added to replace a zinc and a titanium ion, or magnesium and molybdenum could both be added and may replace two titanium ions.

What is claimed is:

1. A process for the manufacture of an attrition resistant sorbent for gas desulfurization, consisting of:

mixing a zinc titanate compound and a metal oxide selected from a group consisting of: magnesium oxide, magnesium oxide plus molybdenum oxide, calcium oxide, yttrium oxide, hafnium oxide, zirconium oxide, cupric oxide and tin oxide, wherein the mixing is achieved by milling the zinc titanate and metal oxide compounds in an aqueous medium forming a resultant slurry;

diving said slurry;

calcining the dried slurry at 750° C. for 3 hours; and crushing and sieving said calcined product.

2. The process described in claim 1, wherein:

the resulting attrition resistant sorbent has a magnesium ion substituted for about 1 percent of the original zinc ions.

3. The process described in claim 1 wherein:

the resulting attrition resistant sorbent has a magnesium ion is substituted for an original zinc ion at a level of from about 0.01 mol percent to about 11 mol percent as magnesium oxide.

4. The process described in claim 1, wherein:

the resulting attrition resistant sorbent has a zirconium ion substituted for about 0.01 percent of the original titanium ions.

5. The process described in claim 1, wherein:

the resulting attrition resistant sorbent has a zirconium ion substituted for an original titanium ion at a level of from about 0.01 mol percent to about 11 mol percent as zirconium oxide.

6. The process described in claim 1, wherein:

said magnesium oxide is added to a concentration in the range of about 0.01 to about 30 mol percent.

7. The process described in claim 1, wherein:

said magnesium oxide plus molybdenum oxide is added to a concentration in the range of about 0.01 to about 30 mol percent.

8. The process described in claim 1, wherein:

said zirconium oxide is added to a concentration in the range of about 0.01 to about 30 mol percent.

9. The process described in claim 1, wherein:

said calcium oxide is added to a concentration of about 0.01 to about 10 mol percent.

10. The process described in claim 1, wherein:

said cupric oxide is added to a concentration of about 0.01 to about 10 mol percent.

11. The process described in claim 1, wherein:

said tin oxide is added to a concentration of about 0.01 to about 30 mol percent.

12. The process described in claim 1, wherein:

said hafnium oxide is added to a concentration of about 0.01 to about 30 mol percent.

* * * * *